US009669321B2

(12) United States Patent
Reveley

(10) Patent No.: US 9,669,321 B2
(45) Date of Patent: Jun. 6, 2017

(54) SYSTEM FOR PROVIDING A VIRTUAL REALITY EXPERIENCE

(71) Applicant: Figment Productions Limited, Guildford, Surrey (GB)

(72) Inventor: Simon Paul Reveley, Guildford (GB)

(73) Assignee: Figment Productions Limited, Guildford (GB)

( * ) Notice: Subject to any disclaimer, the term of this patent is extended or adjusted under 35 U.S.C. 154(b) by 0 days.

(21) Appl. No.: 14/872,707

(22) Filed: Oct. 1, 2015

(65) Prior Publication Data

US 2017/0080349 A1 Mar. 23, 2017

(30) Foreign Application Priority Data

Sep. 21, 2015 (GB) .................................. 1516710.9

(51) Int. Cl.
| | |
|---|---|
| *A63G 31/16* | (2006.01) |
| *G06T 19/00* | (2011.01) |
| *A63G 31/02* | (2006.01) |
| A63B 19/04 | (2006.01) |

(52) U.S. Cl.
CPC ............. *A63G 31/16* (2013.01); *A63G 31/02* (2013.01); *G06T 19/006* (2013.01)

(58) Field of Classification Search
CPC ........ A63G 31/00; A63G 31/16; A63B 19/04; A63B 22/00; A63B 22/02; G09B 9/00; G09B 9/04
USPC .................... 472/43, 59–61, 130; 434/62, 69
See application file for complete search history.

(56) References Cited

U.S. PATENT DOCUMENTS

| | | | |
|---|---|---|---|
| 3,991,485 | A | 11/1976 | Golenski |
| 4,028,725 | A | 6/1977 | Lewis |
| 4,066,256 | A | 1/1978 | Trumbull |
| 4,315,241 | A | 2/1982 | Spooner |

(Continued)

FOREIGN PATENT DOCUMENTS

| | | |
|---|---|---|
| EP | 0468340 A2 | 1/1992 |
| EP | 3041591 A2 | 7/2016 |

(Continued)

OTHER PUBLICATIONS

Benford et al., *Coping With Uncertainty in a Location-Based Game;* IEEE Computer Society, 2(3): 34-43 (2003).

*Primary Examiner* — Kien Nguyen
(74) *Attorney, Agent, or Firm* — Leydig, Voit & Mayer, Ltd.

(57) ABSTRACT

Provided is a system for providing a virtual reality experience, the system including a vehicle controlled to follow a pre-determined path; a virtual reality controller; one or more headsets each including a virtual reality generator and at least one screen, wherein the virtual reality generator is controlled by the virtual reality controller; and a synchronization sensor, wherein the controller includes a memory adapted to store data relating to the path, the synchronization sensor is connected to the controller and includes at least one accelerometer adapted to sense movement of the vehicle, the controller includes a processor adapted to compare data from the synchronization sensor to the data stored in the memory of the controller to calculate the location of the vehicle on the path, and the controller is adapted to synchronize the virtual reality generator with the location of the vehicle on the path.

20 Claims, 2 Drawing Sheets

(56) References Cited

U.S. PATENT DOCUMENTS

| | | | |
|---|---|---|---|
| 4,874,162 A | 10/1989 | Trumbull et al. | |
| 4,984,179 A | 1/1991 | Waldern | |
| 5,006,072 A | 4/1991 | Letovsky et al. | |
| 5,322,441 A | 6/1994 | Lewis et al. | |
| 5,336,132 A | 8/1994 | Murakami | |
| 5,403,238 A | 4/1995 | Baxter et al. | |
| 5,490,784 A * | 2/1996 | Carmein | A63B 22/02 434/29 |
| 5,495,576 A | 2/1996 | Ritchey | |
| 5,584,697 A | 12/1996 | Trumbull | |
| 5,662,253 A | 9/1997 | Goings | |
| 5,669,821 A | 9/1997 | Prather et al. | |
| 5,707,237 A | 1/1998 | Takemoto et al. | |
| 5,716,281 A | 2/1998 | Dote | |
| 5,807,114 A | 9/1998 | Hodges et al. | |
| 5,846,134 A * | 12/1998 | Latypov | A63B 19/04 434/307 R |
| 5,865,624 A * | 2/1999 | Hayashigawa | G09B 9/04 434/29 |
| 5,921,780 A | 7/1999 | Myers | |
| 5,954,508 A | 9/1999 | Lo et al. | |
| 6,179,619 B1 * | 1/2001 | Tanaka | A63G 7/00 434/307 R |
| 6,270,414 B2 * | 8/2001 | Roelofs | 345/156 |
| 8,241,038 B2 * | 8/2012 | Quinn | G09B 9/00 348/121 |
| 2005/0049022 A1 | 3/2005 | Mullen | |
| 2006/0017654 A1 | 1/2006 | Romo | |
| 2009/0111670 A1 | 4/2009 | Williams | |
| 2012/0249416 A1 | 10/2012 | Maciocci et al. | |
| 2013/0083003 A1 | 4/2013 | Perez et al. | |
| 2013/0178257 A1 | 7/2013 | Langseth | |
| 2013/0234914 A1 | 9/2013 | Fujimaki | |
| 2013/0342570 A1 | 12/2013 | Kinnebrew et al. | |
| 2014/0002492 A1 | 1/2014 | Lamb et al. | |
| 2014/0002496 A1 | 1/2014 | Lamb et al. | |
| 2014/0015736 A1 | 1/2014 | Kim | |

FOREIGN PATENT DOCUMENTS

| | | |
|---|---|---|
| GB | 2 376 397 A | 12/2002 |
| JP | S61-048786 A | 3/1986 |
| JP | H02-015230 A | 1/1990 |
| JP | H03-086187 A | 4/1991 |
| JP | H06-218145 A | 8/1994 |
| KR | 20110064586 A | 6/2011 |
| WO | WO 93/16776 A1 | 9/1993 |
| WO | WO 95/27543 A1 | 10/1995 |
| WO | WO 2008/149339 A1 | 12/2008 |
| WO | WO 2011/084895 A1 | 7/2011 |
| WO | WO 2013/050476 A1 | 4/2013 |
| WO | WO 2013/188069 A1 | 12/2013 |
| WO | WO 2014/108693 A1 | 7/2014 |

* cited by examiner

SYSTEM FOR PROVIDING A VIRTUAL REALITY EXPERIENCE

CROSS-REFERENCE TO RELATED APPLICATIONS

This patent application claims priority of GB Patent Application No. 1516710.9, filed Sep. 21, 2015, the contents of which are expressly incorporated herein by reference in their entireties, including any references cited therein.

BACKGROUND OF THE INVENTION

It is known to provide a virtual reality experience in conjunction with movement, for example a roller coaster ride, so that the thrill of the ride is augmented by the virtual reality content. However, there is difficulty in synchronising the virtual reality content with the movement of the vehicle. It is possible to include location sensors or markers along a track or path upon which the vehicle travels in order that the virtual reality system is able to determine the position of the vehicle on the track, but this requires modification of the track or path to retrofit the system or increases the cost of the ride when building it. In addition, the system has to be able to detect the sensors or markers, which may also require modification of the vehicles.

BRIEF SUMMARY OF THE INVENTION

In one embodiment, the present invention relates to a system for providing a virtual reality experience, in particular for users of a vehicle travelling along a known path. The system preferably includes a vehicle controlled to follow a pre-determined path; a virtual reality controller; one or more headsets each including a virtual reality generator and at least one screen, wherein the virtual reality generator is controlled by the virtual reality controller; and a synchronisation sensor. Preferably, the controller includes a memory adapted to store data relating to the path, the synchronisation sensor is connected to the controller and includes at least one accelerometer adapted to sense movement of the vehicle, the controller includes a processor adapted to compare data from the synchronisation sensor to the data stored in the memory of the controller to calculate the location of the vehicle on the path, and the controller is adapted to synchronise the virtual reality generator with the location.

In another embodiment, the present invention provides a method of operating a virtual reality experience, which method includes providing a vehicle controlled to follow a pre-determined path, a virtual reality controller including a memory and a processor, one or more headsets each including a virtual reality generator and at least one screen, and a synchronisation sensor, establishing a master data set relating to the movement of the vehicle along the path, saving the master data set on the memory of the controller; comparing data from the synchronisation sensor to the master data set to determine the position of the vehicle relative to the path; and synchronising the virtual reality generator with the location of the vehicle.

DETAILED DESCRIPTION OF THE INVENTION

Figures 1A, 1B:
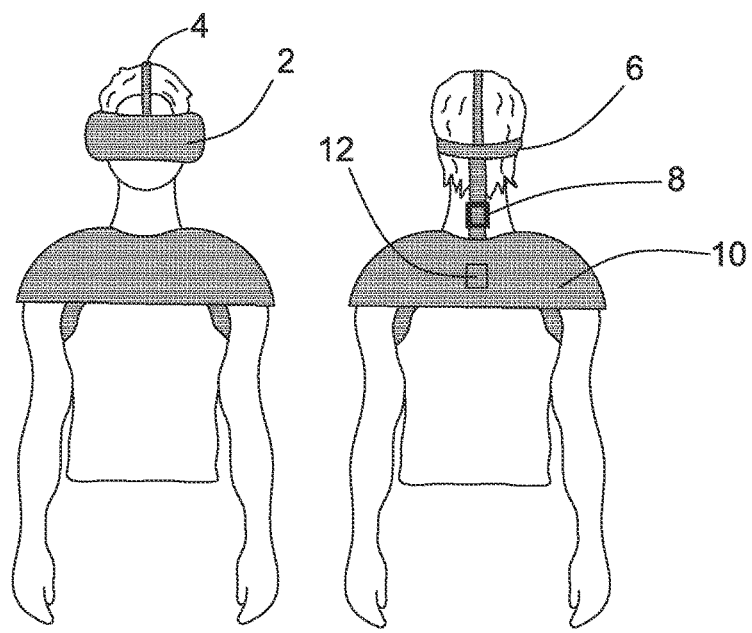
FIGS. 1a and 1b are schematic views of a user wearing a virtual reality headset and associated carrier pack.

According to a first aspect of the invention, there is provided a system for providing a virtual reality experience, the system including a vehicle controlled to follow a pre-determined path; a virtual reality controller; one or more headsets each including a virtual reality generator and at least one screen, wherein the virtual reality generator is controlled by the virtual reality controller; and a synchronisation sensor, wherein the controller includes a memory adapted to store data relating to the path, the synchronisation sensor is connected to the controller and includes at least one accelerometer adapted to sense movement of the vehicle, the controller includes a processor adapted to compare data from the synchronisation sensor to the data stored in the memory of the controller to calculate the location of the vehicle on the path, and the controller is adapted to synchronise the virtual reality generator with the location of the vehicle on the path.

The system therefore detects acceleration of the vehicle, for example it may detect the g-force experienced by the vehicle, as it moves along the path and is able to compare the data from the synchronisation sensor to a "master" set of data stored in the memory of the controller to determine or calculate the position of the vehicle relative to the path. In this way, the forces experienced by a user as a result of the movement of the vehicle in which they are travelling may be synchronised with forces that the user would expect to experience as a result of the virtual reality content.

By calculating or determining the position of the vehicle using sensed data relating to the movement of the vehicle and comparing this to a master set of data, no alteration or adaptation of the track or path or the vehicle itself is necessary; the synchronisation sensor can, for example, be releasably coupled to the vehicle or even worn by a user. In other words, the system is mechanically independent of the ride.

In view of the above, the system may be retro-fitted to a pre-existing vehicle which is constrained or controlled to follow a pre-determined path in space or it may form a part of a new vehicle-based experience in which the vehicle follows a known path. Thus, the system may be fitted to an existing roller coaster ride with no alterations required to the track or the mechanical interaction between the vehicle and the track. Furthermore, as the system is mechanically independent of the vehicle (e.g. the ride or simulator), it may be removed from a first vehicle and installed in a second vehicle, wherein the system can be adapted to synchronise a VR content with the position of the second vehicle on a path.

The path may be a three-dimensional path, such as a roller coaster, a simulator or a three-dimensional ride having a fixed base and one or more articulated arms which move users relative to the base; or it may be a two-dimensional path in which the vehicle moves around a substantially horizontal plane or moves in a substantially vertical plane, for example. However, the path taken by the vehicle should be repeatable so that the controller is able to determine the position of the vehicle relative to the path by comparing movement data with a master data set. Thus, the path may be a fixed path (as in the case of a roller coaster, for example) or the vehicle may be controlled to follow a repeated, pre-determined series of movements that result in a repeatable, pre-determined path through space.

In an embodiment of the invention, the virtual reality controller is adapted to be worn by a user and is connected to the virtual reality generator via a wired or wireless connection. Thus, the controller may form a part of the headset or it may be worn by a user in use separate from the headset.

The synchronisation sensor suitably includes at least two accelerometers or "G-force sensors" so that acceleration/deceleration in two planes may be detected or sensed. For example, the synchronisation sensor may comprise three accelerometers such that motion about three mutually orthogonal axes may be sensed or detected (i.e. pitch, roll and yaw movements may be sensed). Additionally or alternatively, the synchronisation sensor may include a gyroscope.

As the headset is intended to be portable, it is suitably powered by one or more batteries. The batteries may be rechargeable. In embodiments in which the virtual reality controller is adapted to be worn by a user, the virtual reality controller may also be powered by one or more batteries. In such embodiments, the or each controller battery may be the same as or different to the or each headset battery.

As noted above, the synchronisation sensor may be adapted to be worn by a user in use or it may be adapted to be releasably coupled to the vehicle in use. For example, the synchronisation sensor may be located in the headset, it may located within an article of clothing worn by the user or it may be carried by the user.

The data relating to the path that is stored in the memory of the controller (i.e. the master data set) suitably includes data corresponding to forces exerted upon (i.e. experienced by) the vehicle as it moves along the path. The data may include data points relating to selected points along the path.

The controller may include one or more predictive algorithms which are able to predict future movements of the vehicle based on the master data set.

According to a second aspect of the invention, there is provided a method of operating a virtual reality experience, the method comprising: providing a vehicle controlled to follow a pre-determined path, a virtual reality controller including a memory and a processor, one or more headsets each including a virtual reality generator and at least one screen, and a synchronisation sensor; establishing a master data set relating to the movement of the vehicle along the path; saving the master data set on the memory of the controller; comparing data from the synchronisation sensor to the master data set to determine the position of the vehicle relative to the path; and synchronising the virtual reality generator with the location of the vehicle.

The master data set may be obtained by running the vehicle along the path in a data acquisition mode. In the data acquisition mode, the controller may be disconnected from the headsets or the headsets may be absent. The vehicle may move along the path for a number of times in the data acquisition mode in order to provide a number of discrete data sets that are averaged to form the master data set. The data sets may be manipulated to "smooth" and/or optimise the data which forms the master data set. The master data set suitably provides an ideal/most common sequence of sensor readings along the path.

Once the master data set has been obtained, it is stored in the memory of the controller. The controller is then able to compare data from the synchronisation sensor with the stored master data set to determine or calculate the position of the vehicle in relation to the path. The controller may then control the virtual reality generator such that a virtual reality content generated by the generator is synchronised with the movement of the vehicle. In an embodiment of the invention, the known issue of "drift" that is commonly associated with accelerometer data is compensated for by the controller. This may be achieved by comparing the accelerometer data against the master data set and bringing the accelerometer data into alignment. The controller may constantly compare the data against the master data set or it may compare it periodically, for example in accordance with a pre-determined or pre-programmed comparison schedule.

The step of synchronising the virtual reality generator with the location of the vehicle may include displaying virtual reality images on the or each screen. The virtual reality images suitably include movement that corresponds with the movement of the vehicle.

In order to synchronise the start of the virtual reality content generated by the virtual reality generator with the start of the vehicle movement (i.e. when the vehicle first moves from its start position), the step of synchronising the virtual reality generator with the location of the vehicle suitably includes generating a start signal when the vehicle moves from its start position and synchronising the start of the virtual reality content (i.e. displaying the first virtual reality images) with the start signal.

The skilled person will appreciate that the features described and defined in connection with the aspects of the invention and the embodiments thereof may be combined in any combination, regardless of whether the specific combination is expressly mentioned herein. Thus, all such combinations are considered to be made available to the skilled person.

Figure 2:
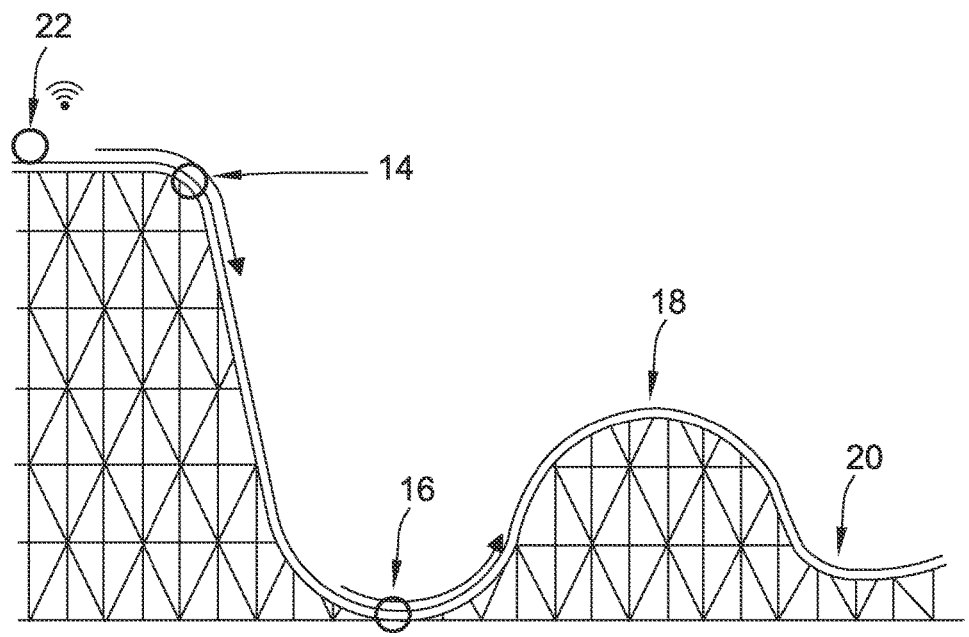
FIG. 2 is a schematic view of a portion of a roller coaster ride.

An embodiment of the invention will now be described, by way of example only, with reference to the accompanying drawings in which:

FIGS. 1a and 1b are schematic views of a user wearing a virtual reality headset and associated carrier pack;

FIG. 2 is a schematic view of a portion of a roller coaster ride; and

Figure 3:
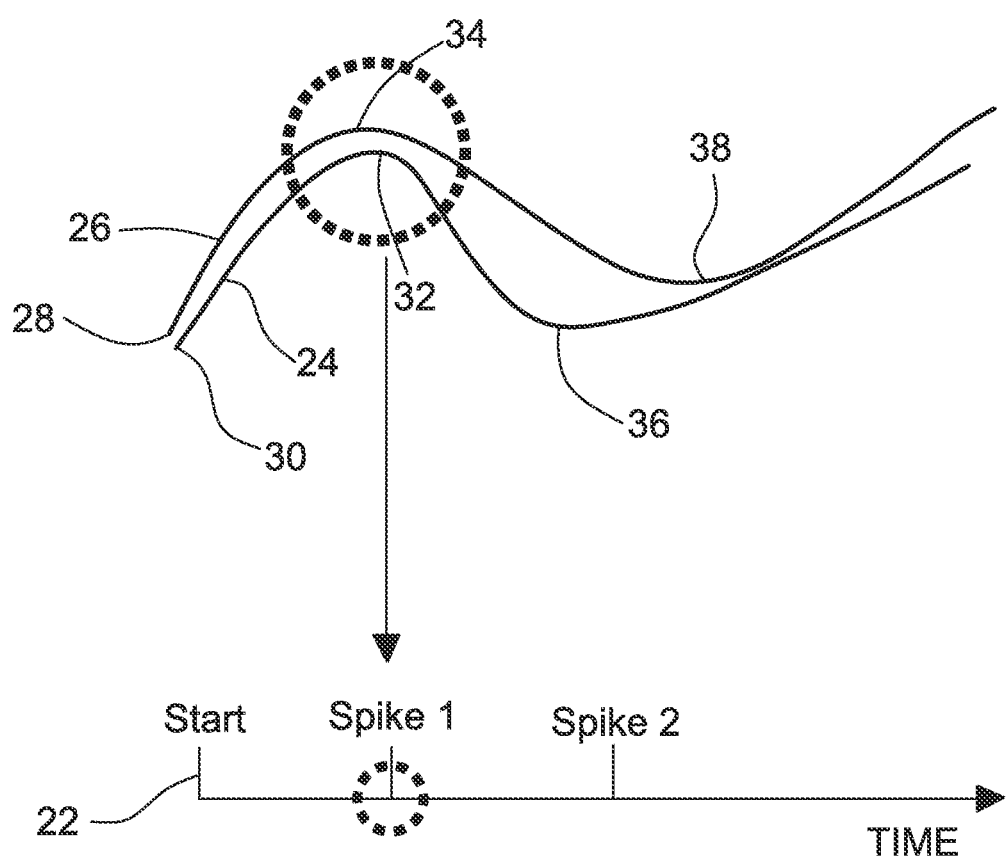
FIG. 3 is a schematic view of sensed data compared with a master data set.

FIG. 3 is a schematic view of sensed data compared with a master data set.

For the avoidance of doubt, the skilled person will appreciate that in this specification, the terms "up", "down", "front", "rear", "upper", "lower", "width", etc. refer to the orientation of the components as found in the example when installed for normal use as shown in the Figures.

In this embodiment, the path is defined by a roller coaster track and the vehicle travels along the track from a start point to an end point and then returns to its start position. Thus, in this embodiment, the roller coaster track defines a fixed path in space along which the vehicle travels in a repeatable and predictable way.

FIGS. 1a and 1b show a user wearing a virtual reality headset 2. The headset is kept in place via a first restraining strap 4 which is located over the top of the head in use, and a second restraining strap 6 which is located around the back of the head in use. The first and second restraining straps 4, 6 prevent the headset from being detached from the user during the roller coaster ride.

The first restraining strap extends downwards via an adjustable connecting portion 8 to a wearable carrier pack 10 which is worn over the shoulders of the user. The carrier pack 10 includes compartments which contain a synchronisation sensor 12 and a rechargeable battery pack (not shown). The rechargeable battery pack provides electrical power to the components located within the headset and the synchronisation sensor.

The headset 2 includes a screen (not shown) which extends across a forward facing interior portion of the headset, a virtual reality generator (not shown) which generates and displays virtual reality content (i.e. a sequence of virtual reality images) onto the screen, and a controller (not shown) which controls the virtual reality generator.

The synchronisation sensor 12 includes a gyroscope and three accelerometers arranged in mutually orthogonal axes (often referred to as the X, Y and Z axes or the yaw, roll and pitch axes) such that the sensor 12 is able to detect movement of the vehicle (and thus the user) about each of the three axes.

The synchronisation sensor 12 is wirelessly connected to the controller such that data from the synchronisation sensor is transmitted wirelessly to a receiver which forms part of the controller. Accordingly, the synchronisation sensor 12 includes a wireless data transmitter which transmits data to the receiver.

As the synchronisation sensor 12 wirelessly transmits data to the controller, the skilled person will appreciate that the synchronisation sensor need not be worn by the user. The synchronisation sensor 12 may be located within the vehicle. However, in such an embodiment, two rechargeable battery packs would be needed: one for the synchronisation sensor and a separate one for the headset components. The skilled person will appreciate that the headset may be connected to a common power source, which may, for example, be located within the vehicle in use.

It will be appreciated that a number of the headsets 2 and carrier packs 10 will be provided for the roller coaster, as each roller coaster tends to have a number of vehicles running on the tracks at any given time and each vehicle can accommodate a number of users.

In order to generate a master data set against which data recorded by the synchronisation sensor may be compared, the vehicle is run around the track a number of times the synchronisation sensor located within the vehicle or worn by a user travelling within the vehicle (i.e. in a data acquisition phase). During these times, the controller is configured in a data acquisition mode in which data from the synchronisation sensor 12 is recorded, but the virtual reality generator is not active. Suitably, the synchronisation sensor should be substantially stationery relative to the vehicle in use so that the acquisition mode records data relating substantially to the movement of the vehicle only.

A computer programme then generates a master data set based on average values and identifiable data points which provide data "spikes". FIG. 2 shows a section of a roller coaster track having a number of identifiable data points 14, 16, 18, 20.

There may be three sets of master data (one for each accelerometer) or the data from the three accelerometers may be combined to generate a single master data set.

A start signal 22 in the form of a wireless signal which is emitted when the vehicle begins to move provides a reference point for the acquired data. This enables the software to average and smooth the raw data to generate the master data set.

When the master data set has been generated, it is saved into the memory of each virtual reality controller and a processor, which also forms a part of the controller, is able to compare data received from the respective synchronisation sensor to the master data set to calculate or determine the location of the vehicle relative to the track and to predict subsequent motion or movement of the vehicle. Based on the relative positional data and the predictive algorithm stored in the controller, the controller is able to synchronise the virtual reality content projected onto the screen with the movement of the vehicle such that forces that a user would expect to feel as a result of the virtual reality content are actually felt as a result of the movement of the vehicle.

FIG. 3 shows data 24 received from the synchronisation sensor 12 and the corresponding master data set 26 for that section of the track. As can be seen, the start point 28 for the master data set closely matches the start point 30 for the specific vehicle journey and this corresponds with the start signal 22. A first spike 32 in the measured data 24 corresponds with a corresponding expected spike 34 in the master data set 26. However, a second spike 36 in the measured data 24 occurs slightly earlier than predicted from the corresponding spike 38 of the master data set 26. As a result of this, the virtual reality content is adjusted and the controller adjusts the calculated position of the vehicle accordingly. The adjustments in the virtual reality content are not noticeable by the user.

When the particular journey of the vehicle ends, the controller resets the virtual reality content and awaits the next start signal 22. The skilled person will appreciate that the end of the journey may include an end signal (not shown).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system for providing a virtual reality experience, the system comprising:
   a vehicle controlled to follow a pre-determined path;
   a virtual reality controller
   one or more headsets each including a virtual reality generator and at least one screen, wherein the virtual reality generator is controlled by the virtual reality controller; and-a synchronisation sensor including at least one accelerometer adapted to sense movement of the vehicle,
   wherein the virtual reality controller includes a memory which stores master data relating to the path, the master data relating to forces experienced by the vehicle as it moves along the path; the synchronisation sensor is connected to the virtual reality controller the virtual reality controller includes a processor adapted to compare movement data from the synchronisation sensor to the master data stored in the memory of the virtual reality controller to calculate the location of the vehicle on the path; and the virtual reality controller is adapted to synchronise the virtual reality generator with the location of the vehicle on the path.

2. A system according to claim 1, wherein the virtual reality controller is adapted to be worn by a user and is connected to the virtual reality generator via a wired or wireless connection.

3. A system according to claim 1, wherein the synchronization sensor includes at least two accelerometers.

4. A system according to claim 1, wherein the system further includes one or more batteries electrically connected to the controller and/or the headset.

5. A system according to claim 1, wherein the synchronisation sensor is adapted to be worn by a user.

6. A system according to claim 1, wherein the synchronisation sensor is releasably coupled to the vehicle.

7. A system according to claim 1, wherein the data relating to the path includes force data corresponding to forces exerted upon the vehicle at selected points along the path.

8. A system according to claim 1, wherein the virtual reality controller is carried by the vehicle.

9. A system according to claim 1, wherein the master data is indicative of forces experienced by the vehicle as it moves along the path.

10. A system according to claim 9, wherein the movement data comprises acceleration data.

11. A method of operating a virtual reality experience, the method comprising:
    providing a vehicle controlled to follow a pre-determined path, a virtual reality controller including a memory and a processor, one or more headsets each including a virtual reality generator and at least one screen, and a synchronisation sensor including at least one accelerometer adapted to sense movement of the vehicle;
    establishing a master data set relating to the movement of the vehicle along the path, the master data set relating to forces experience by the vehicle as it moves along the path;
    saving the master data set on the memory of the virtual reality controller;
    comparing data from the synchronisation sensor to the master data set to determine the position of the vehicle relative to the path; and
    synchronising the virtual reality generator with the location of the vehicle.

12. A method according to claim 11, wherein the synchronisation of the virtual reality generator to the position of the vehicle is controlled by the virtual reality controller.

13. A method according to claim 12, wherein the virtual reality generator displays virtual reality images on the or each screen.

14. A method according to claim 11, wherein the method includes receiving a start signal when the vehicle begins to move along the path and synchronising the virtual reality generator with the start of the vehicle.

15. A method according to claim 11, wherein the step of establishing the master data set includes moving the vehicle along the pre-determined path.

16. A system for providing a virtual reality experience, the system comprising:
    a vehicle controlled to move along a pre-determined path;
    one or more headsets, each headset including a virtual reality generator and at least one screen; and
    a synchronisation sensor including at least one accelerometer adapted to sense movement of the vehicle and generate movement data indicative of the movement of the vehicle,
    a virtual reality controller including a processor and memory, the controller configured to:
    store master data indicative of forces experienced by the vehicle as it moves along the path;
    receive the movement data from the synchronisation sensor;
    determine the location of the vehicle along the path based upon the movement data from the synchronisation sensor and the master data; and
    control the virtual reality generator including synchronise the virtual reality generator with the location of the vehicle on the path.

17. A system according to claim 16, wherein the master data is indicative of acceleration experienced by the vehicle as it moves along the path.

18. A system according to claim 17, wherein the movement data comprises acceleration data.

19. A system according to claim 16, wherein the data relating to the path includes force data corresponding to forces exerted upon the vehicle at selected points along the path.

20. A system according to claim 16, wherein the virtual reality controller is carried by the vehicle.

* * * * *

UNITED STATES PATENT AND TRADEMARK OFFICE
CERTIFICATE OF CORRECTION

PATENT NO. : 9,669,321 B2
APPLICATION NO. : 14/872707
DATED : June 6, 2017
INVENTOR(S) : Simon Paul Reveley Page 1 of 1

It is certified that error appears in the above-identified patent and that said Letters Patent is hereby corrected as shown below:

In the Claims

Claim 1, Line 8, "and-a" should read --and a--.

Claim 13, Lines 2-3, "on the or each" should read --on each--.

Signed and Sealed this
Fifth Day of September, 2017

Joseph Matal
*Performing the Functions and Duties of the*
*Under Secretary of Commerce for Intellectual Property and*
*Director of the United States Patent and Trademark Office*